United States Patent [19]

Yoshimoto et al.

[11] Patent Number: 4,703,240
[45] Date of Patent: Oct. 27, 1987

[54] SYSTEM FOR GUIDING A DRIVERLESS VEHICLE

[75] Inventors: Yoshio Yoshimoto, Aichi; Minoru Kondoh, Kounan; Yoshiyuki Terada, Inuyama, all of Japan

[73] Assignee: Murata Kikai Kabushki Kaisha, Kyoto, Japan

[21] Appl. No.: 836,309

[22] Filed: Mar. 5, 1986

[30] Foreign Application Priority Data

Mar. 7, 1985 [JP] Japan ................................. 60-45829

[51] Int. Cl.⁴ ............................................. G05D 1/00
[52] U.S. Cl. ................................... 318/587; 318/640; 250/202; 180/169
[58] Field of Search ............... 318/587, 640; 250/202, 250/214; 180/169

[56] References Cited

U.S. PATENT DOCUMENTS

| | | | |
|---|---|---|---|
| 3,738,443 | 6/1973 | Kubo | 318/587 X |
| 4,003,445 | 1/1977 | De Bruine | 318/587 X |
| 4,219,092 | 8/1980 | Richter | 318/587 X |
| 4,500,970 | 2/1985 | Daemmer | 318/587 X |

*Primary Examiner*—Benjamin Dobeck
*Attorney, Agent, or Firm*—Spensley Horn Jubas & Lubitz

[57] ABSTRACT

A driverless vehicle is guided along a guideline which is detected on a floor by an optical sensor having a plurality of light receiving elements. A value representing the amount of light received by each of the light receiving elements is composed with a value representing the amount of light received by one or more neighbouring light receiving elements and smoothed to an appropriately large value so that the detection of the guideline may be based on the smoothed value.

8 Claims, 9 Drawing Figures

SYSTEM FOR GUIDING A DRIVERLESS VEHICLE

FIELD OF THE INVENTION AND RELATED STATEMENT

This invention relates to a driverless vehicle which is used to, for example, transport articles in a warehouse or factory. More particularly, it relates to a driverless vehicle which is guided along a guideline provided on a floor and detected by an optical sensor.

There is known an optical guide system for a driverless vehicle. It includes an optical sensor which detects a guideline on a floor to enable the vehicle to travel along the guideline. The light emitted by a source of light is reflected by the surface of the floor and the reflected light is received by a plurality of light receiving elements. The difference between the amounts of light received by the light receiving elements is relied upon for the detection of the guideline which is a white color.

The floor is likely to have a portion of high reflectivity beside the guideline, or some foreign matter of high reflectivity is likely to exist on the floor in the area where the guideline does not exist. As a result, the light receiving element which does not happen to be located for detecting the guideline is likely to receive unexpectedly intense reflected light. If the system considers this light as indicating the position of the guideline, the vehicle fails to travel correctly along the guideline.

OBJECT AND SUMMARY OF THE INVENTION

An object of the present invention to provide a system for guiding a vehicle in which any error in the detection of the guide line is avoided.

According to this invention, a value representing the amount of light received by each light receiving element of the optical sensor is compared with a value representing the amount of light received by one or more neighboring light receiving elements and smoothed to an appropriately large value so that the detection of the guideline may be based on the smoothed value.

The system of this invention enables the smoothing of the amount of light received from any portion or material of high reflectivity, other than the guideline, and thereby the avoidance of any error in the detection of the guideline that might result in the travel of the driverless vehicle along a wrong path.

DETAILED DESCRIPTION OF PREFERRED EMBODIMENTS

Figure 4:
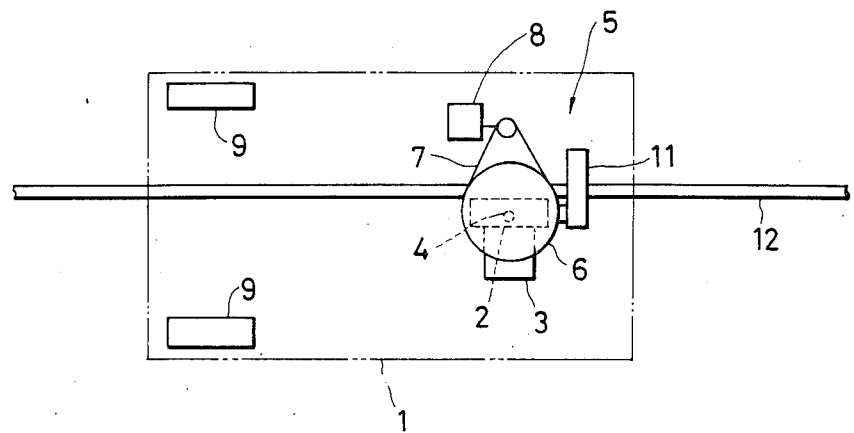
FIG. 4 is a schematic top plan view showing a driverless vehicle by way of example.
Figure 5:
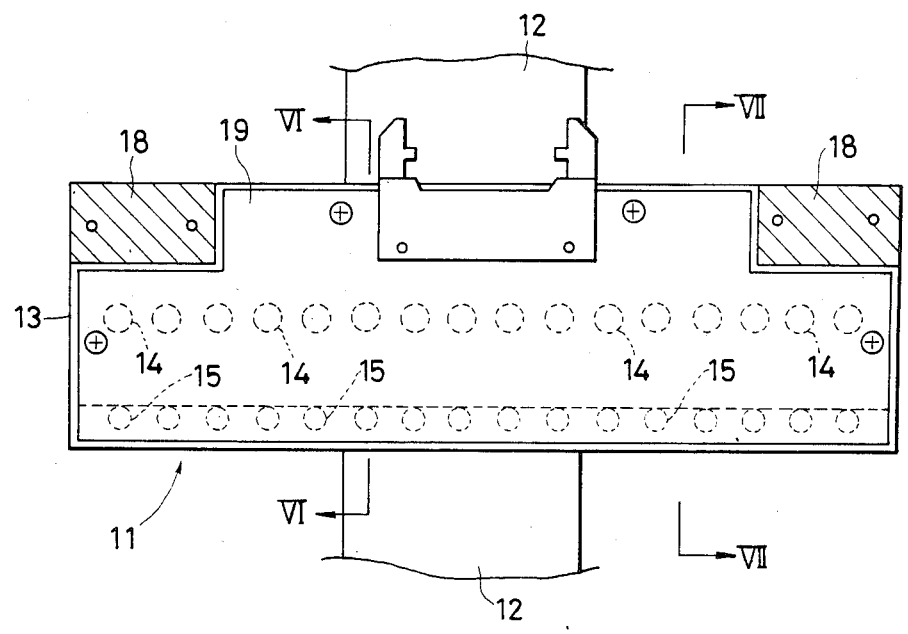
FIG. 5 is a top plan view of the optical sensor.

FIG. 4 is a schematic top plan view showing a three-wheeled driverless vehicle by way of example. The vehicle 1 includes a driving wheel 2 connected directly to a motor 3 and adapted for rotating about a vertical shaft 4 for steering purpose. A steering device 5 comprises a sprocket 6 secured to the vertical shaft 4 and a steering motor 8 connected to the sprocket 6 by a chain 7. A pair of driven wheels are shown at 9. An optical sensor 11 is connected to the vertical shaft 4 for rotating simultaneously with the driving wheel 2. A guideline is shown at 12.

Figure 7:
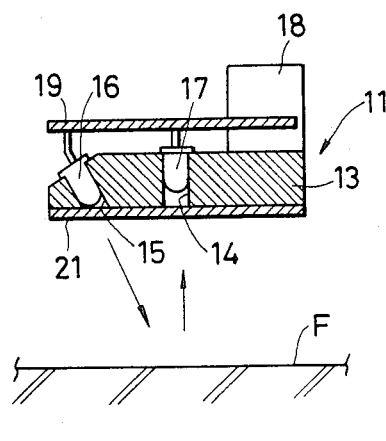
FIGS. 6 and 7 are sectional views taken along the lines VI—VI and VII—VII, respectively, of FIG. 5.
Figure 6:
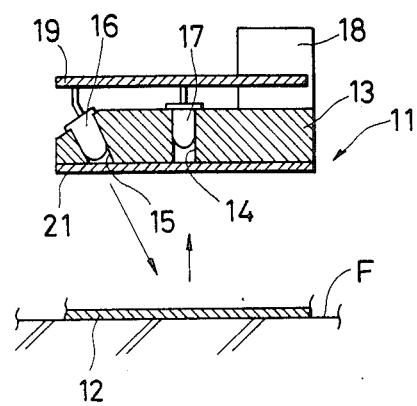

Referring to FIGS. 5 to 8, the optical sensor 11 comprises a generally rectangular base 13 having two longitudinal rows of holes each consisting of 16 holes 14 or 15. Each of the holes 15 holds an infrared light emitting diode 16 as a source of light and each hole 14 holds a phototransistor 17 as a light receiving element. The base 13 is connected to the vehicle 1 by a block 18. The optical sensor also includes a print base 19 and a red color filter 21. FIG. 6 is a sectional view taken along the line VI—VI of FIG. 5 and shows the guideline 12 directly below the light receiving elements 17. FIG. 7 is a sectional view taken along the line VII—VII of FIG. 5 and shows the light receiving elements 17 below which the guideline 12 does not exist.

Figure 8:
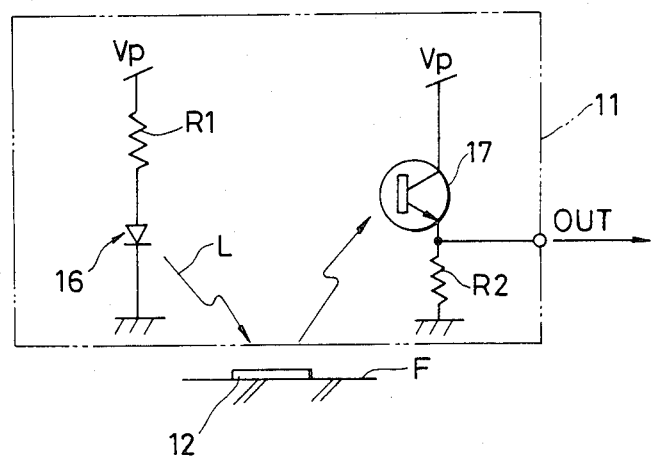
FIG. 8 is a circut diagram.

FIG. 8 shows a circuit for the infrared light emitting diode 16 and the phototransistor 17. If a voltage Vp is applied to the diode 16, light L is emitted and the light reflected by the floor or guideline is received by the phototransistor 17 which in turn outputs a voltage proportional to the amount of the incident light, as shown at OUT.

Thus, the output voltage of each phototransistor 17 depends on the amount of light reflected by the floor directly below the phototransistor 17. The difference in output voltage makes it possible to determine the reflectivity of the area by which light has been reflected, and thereby whether it is the guideline or any other floor portion.

The position of the guideline can be detected in a way which will hereinafter be described.

Figure 9:
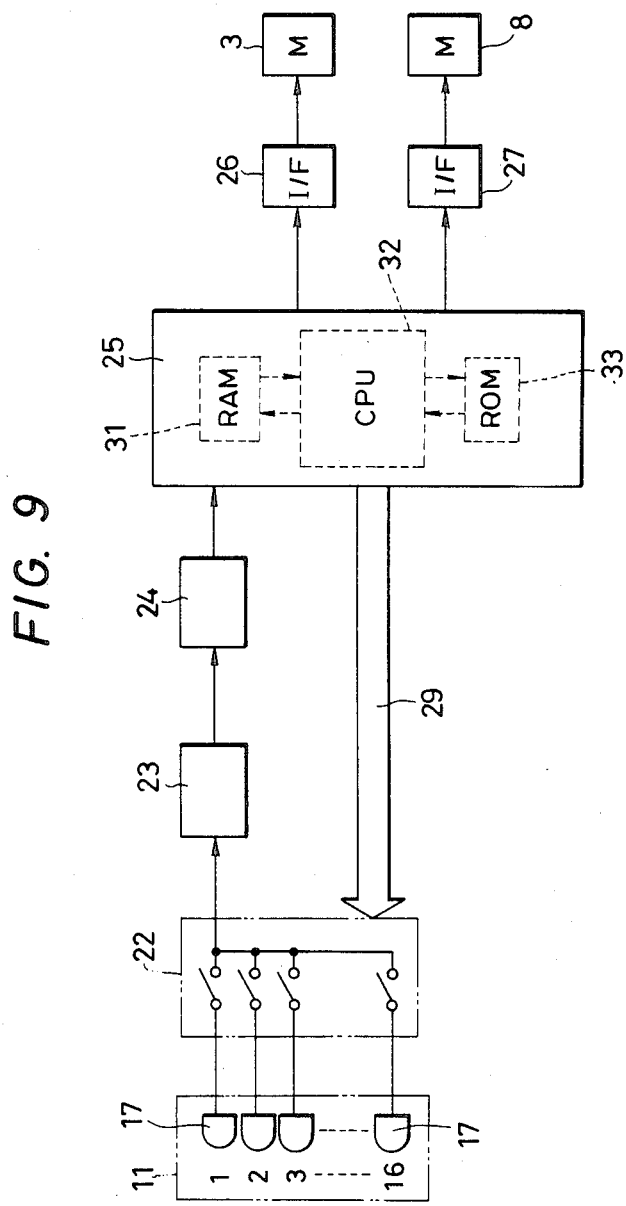
FIG. 9 is a block diagram showing the connection of, for example, a computer and an optical sensor on the driverless vehicle.

Referring to FIG. 9, each phototransistor 17 is connected to a computer 25 on the vehicle 1 through an analog multiplexer 22, an amplifier 23 and an A/D converter 24. The computer 25 is connected to the driving and steering motors 3 and 8 through interfaces 26 and 27, respectively, so that the computer 25 may calculate the position of the guideline from the output signal of the phototransistor 17 and thereby enable the driving motor 3 or the steering motor 8 to be appropriately driven to guide the vehicle correctly along the guideline, as will hereinafter be described in further detail. The computer 25 includes a RAM 31, a CPU 32 and a ROM 33.

The multiplexer 22 is appropriately switched in response to a phototransistor select order 29 from the computer 25. The output voltage of each phototransistor 17 is inputted to the A/D converter one after another beginning with the phototransistor at one end of the sensor, converted to a corresponding digital value and stored in the RAM 31 in the computer 25.

For example, a voltage of 3 V from the first phototransistor 17, a voltage of 3.5 V from the second phototransistor 17, a voltage of 4 V from the third phototransistor 17, and so on are stored in the memory 31 through the amplifier 23 and the A/D converter. The voltage values stored therein are processed as will hereunder be described.

Figure 1:
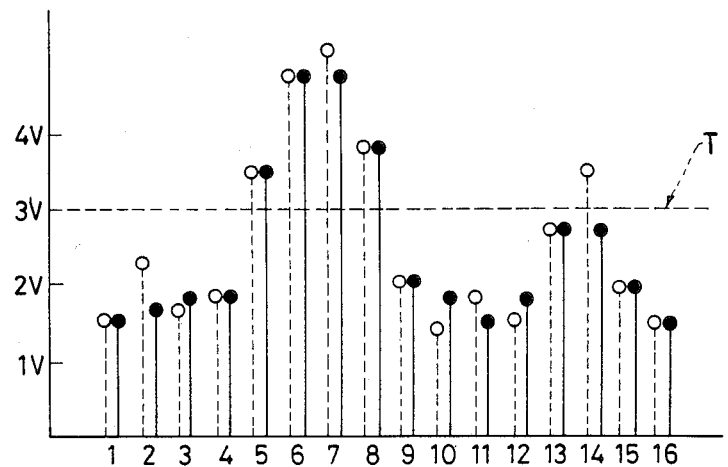
FIG. 1 is a bar graph showing the smoothed values for the light receiving elements as obtained by a system embodying this invention, in which each bar having a black circle shows a smoothed value obtained from the amount of light received by one of the light receiving elements, while the actual amount of light thereby received is shown by a bar having a white circle.

Referring to the bar graph of FIG. 1, each bar having a white circle shows the recorded voltage representing the amount of light received by each phototransistor. The numbers appearing along the axis of abscissa indicate the positions of the phototransistors (see FIG. 3), while the axis of ordinate indicates the amount of light received by each phototransistor. The value shown by each bar having a white circle is the amount of the light actually received by each phototransistor and faithfully reflects the influence of any particularly bright portion of the floor or any dust of high reflectivity. Therefore, the bar is likely to indicate a particularly large value, as shown at No. 14 in FIG. 1, even if the phototransistor in question may not be located directly above the guideline. In order to eliminate any such influence, the voltage value is smoothed as will hereunder be described.

FIG. 1 shows that a voltage of 1.5 V has been detected from each of the first and 16th phototransistors, i.e., from the phototransistor at each end of the sensor. It is compared with the voltage detected from the immediately neighboring phototransistor (the second or 15th) and the smaller value is adopted as a smoothed voltage value for the output of the phototransistor at each end of the sensor. For example, the smoothed voltage value of the first phototransistor is the value actually detected from the first transistor, as the latter is smaller than the value actually detected from the second phototransistor.

The smoothing of the voltage value for each of the second to 15th phototransistors is carried out by comparing the actual value with those detected from two neighboring phototransistors and adopting the second largest value. For example, the smoothed voltage for the 14th phototransistor is the actual value detected from the 13th phototransistor which is the second largest of the actual values detected from the 13th to 15th phototransistors.

The smoothed value for each phototransistor is shown by a bar having a black circle in FIG. 1.

An appropriate threshold value T is selected from all of the smoothed values which have been obtained for the phototransistors 17 by calculation as has hereinabove been described.

Figure 3:
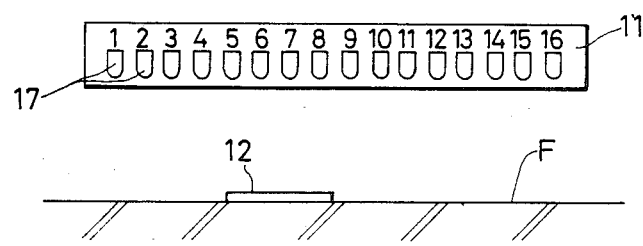
FIG. 3 is a diagrammatic view showing the positional relationship between the phototransistors in the optical sensor and the guideline.

As is obvious from FIGS. 1 and 3, not only the phototransistors (Nos. 5 to 8) located directly above the guideline, but also the phototransistor (No. 14) not located directly thereabove gives a value exceeding the threshold value T before it is smoothed, but after smoothing, only the values shown for the phototransistors (Nos. 5 to 8) located directly above the guideline exceed the threshold value T, so that the guideline may be detected correctly.

Then, the center of the guideline is obtained from the threshold value T and the smoothed values.

Figure 2:
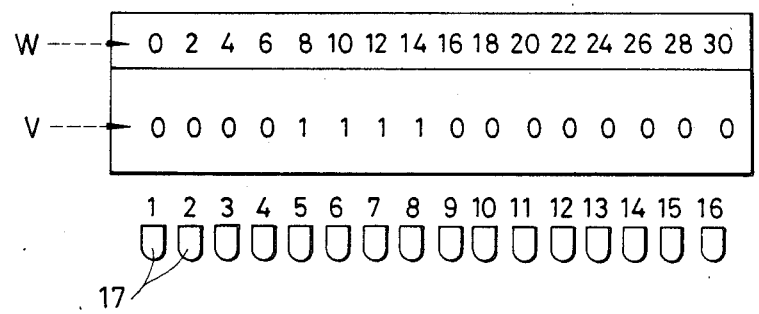
FIG. 2 is a diagram showing the weight value representing the position of each phototransistor and the binary code assigned to the smoothed voltage value for each phototransistor.

The smoothed value for each of the phototransistors (Nos. 1 to 16) is shown by binary-coded notation as 1 if it exceeds the threshold value T, or as 0 if it does not. The results are shown in FIG. 2. The code 1 is given to the value for each of the No. 5 to 8 phototransistors, and the code 0 to the value for each of the other phototransistors.

The binary-coded voltage value V of 0 or 1 is multiplied by a weight value W selected by considering the position of each of the phototransistors (Nos. 1 to 16) (e.g., a number which becomes greater from the leftmost phototransistor to the rightmost one, or 0 to 30 in FIG. 2). Then, the product is divided by the sum of the values obtained by binary-coded notation, i.e., the number of the phototransistors 17 showing the smoothed values which exceed the threshold value, whereby the center of the guideline is determined.

This way of calculation enables the correct detection of the center of the guideline irrespective of the width of the guideline and despite the smoothing of the values, since the sum of the binary-coded values corresponds to the width of the guideline. Therefore, it is possible to reduce the influence of any particularly high value.

If the center of the guideline is determined by the computer 25 as hereinabove described, the steering motor 8 is rotated in either direction to rectify any positional deviation of the vehicle from the guideline as it is detected by the sensor 11.

The system embodying this invention as hereinabove described makes it possible to distinguish clearly the values exceeding the threshold value T (Nos. 5 to 8) from those not exceeding it (Nos. 1 to 4 and 9 to 16). In other words, it makes their boundaries (between No. 4 and No. 5 and between No. 8 and No. 9) clear. In other words, it correctly locates the boundary between the guideline and any other portion and detects the guideline.

Although the system has been described as comparing the values detected from a particular phototransistor and two neighboring ones, it is not intended for limiting the scope of the invention. For example, this invention can also be embodied to realize a smoothed value by comparing the values detected from a particular phototransistor and four neighbouring ones and adopting the mean value of the five detected values as the smoothed value.

As is obvious from the foregoing description, the system of this invention does not erroneously conclude as indicating the guideline any particularly large amount of light that may be received by any of the light receiving elements not located directly above the guideline, but enables the driverless vehicle to continue traveling correctly along the guideline.

What is claimed is:
1. A method for guiding a driverless vehicle along a guideline which is detected on a surface by an optical sensor having a plurality of light receiving elements, each of said elements being operable to detect the amount of light reflected from a different region of said surface and to generate a signal in response thereto, said method comprising the steps of:
   measuring a plurality of values representing the amount of light received by each of said plurality light receiving elements,
   comparing the measured value associated with each of said plurality of light receiving elements with a value representing the amount of light received by one or more neighboring light receiving elements,
   selecting a smoothed value associated with each light receiving elements based upon the comparison of measured values, assigning a weighted value associated with each light receiving element based upon the relative position of said light receiving element;

calculating the location of the guideline based on said smoothed value and said weighted value associated with each light receiving element, whereby said vehicle is guided along said surface in accordance with the calculated location of the guideline.

2. The method as claimed in claim 1, wherein said step of selecting a smoothed value further comprises the steps of:

comparing the amount of light received by each light receiving element with the amount of light received by at least one adjacent light receiving element, selecting the smaller amount of light received as a smoothed value for each light receiving element having only one adjacent light receiving element, and selecting the mean amount of light received as a smoothed value for each light receiving element having more than one adjacent light receiving element.

3. The method as claimed in claim 2 further comprising the steps of:

selecting a threshold value from among all of the smoothed values, and multiplying the smoothed values exceeding the threshold value by said weighted value associated with each sensor element.

4. The method as claimed in claim 3, wherein the center of the guide line is determined by:

numbering all of said light receiving elements in order according to the relative positions of said light receiving elements, and dividing the sum of the numbered values of those light receiving elements showing the smoothed values which exceed the threshold value by the total of the light receiving elements showing the smoothed values which exceed the threshold value.

5. A system for guiding a vehicle along a surface having a light reflecting guide line, said system comprising:

a plurality of sensor elements associated with said vehicle, each of said sensor elements being operable to detect the amount of light reflected from a different region of said surface and to generate a signal in response thereto, said signal having a value corresponding to the amount of light reflected by said region;

first comparison means for comparing the value of signals generated by adjacent sensor elements;

selection means for selecting a smoothed value associated with each sensor element based upon the comparison of values made by said first comparison means;

weighting means for assigning a weighted value associated with each sensor element based upon the relative position of said sensor element;

calculation means for calculating the location of the guide line based upon the smoothed value and the weighted value associated with each sensor element;

whereby said vehicle is guided along said surface in accordance with the location of the guide line calculated by said calculated means.

6. A system as in claim 5 further comprising:

second comparison means for comparing each of said smoothed values with a predetermined threshold value, and multiplication means for multiplying the smoothed values greater than the threshold value by said weighted value associated with each sensor element.

7. A method for guiding a vehicle along a surface having a light-reflecting guideline, said vehicle having a plurality of sensor elements associated therewith, said method comprising the steps of:

detecting the amount of light reflected from a plurality of different regions of said surface and generating a corresponding plurality of signals in response thereto, each of said signals having a value corresponding to the amount of light reflected by one of said different regions, comparing the value of signals generated by adjacent sensor elements;

selecting a smoothed value associated with each sensor element based upon the comparison of values;

assigning a weighted value associated with each sensor element based upon the relative position of said sensor element;

calculating the location of the guideline based upon the smoothed value and the weighted value associated with each sensor element;

whereby said vehicle is guided along said surface in accordance with the calculated location of the guideline.

8. A system as in claim 5 further comprising:

guide means responsive to said calculation means for guiding said vehicle.

* * * * *